United States Patent
Pechanec et al.

(10) Patent No.: US 10,229,033 B2
(45) Date of Patent: *Mar. 12, 2019

(54) SYSTEM, METHOD AND APPARATUS FOR DEBUGGING OF REACTIVE APPLICATIONS

(71) Applicant: Red Hat, Inc., Raleigh, NC (US)

(72) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/612,280

(22) Filed: Jun. 2, 2017

(65) Prior Publication Data

US 2017/0270028 A1  Sep. 21, 2017

Related U.S. Application Data

(63) Continuation of application No. 14/930,910, filed on Nov. 3, 2015, now Pat. No. 9,672,135.

(51) Int. Cl.
*G06F 9/44* (2018.01)
*G06F 11/36* (2006.01)

(52) U.S. Cl.
CPC ................ *G06F 11/3644* (2013.01)

(58) Field of Classification Search
CPC .................................................. G06F 11/3688
USPC ........................................................ 717/124
See application file for complete search history.

(56) References Cited

U.S. PATENT DOCUMENTS

| | | |
|---|---|---|
| 6,324,683 B1 | 11/2001 | Fuh et al. |
| 6,826,749 B2 | 11/2004 | Patel et al. |
| 7,665,046 B2 | 2/2010 | Ng et al. |
| 7,890,916 B1 | 2/2011 | Donlin et al. |
| 8,495,287 B2 | 7/2013 | Collura et al. |

(Continued)

FOREIGN PATENT DOCUMENTS

JP  2003036123  2/2003

OTHER PUBLICATIONS

Android Java: Way to Effectively Pause System Time While Debugging?, retrieved from http://gamedev.stackexchange.com/questions/35587/android-java-way-to-effectively-pause-system-time-while-debugging (1 page).

(Continued)

*Primary Examiner* — Chameli Das
(74) *Attorney, Agent, or Firm* — K&L Gates LLP

(57) ABSTRACT

A debugger executes on a computer system to receive a first debugging command from a client, where the first debugging command sets a first instruction in the reactive application to suspend execution of the reactive application, and where during execution of the reactive application the first instruction is triggered which suspends execution of the reactive application. Responsive to the execution of the reactive application being suspended, a system clock of the reactive application is replaced with a substitute clock and the substitute clock is paused. The debugger then receives a second debugging command, where the second debugging command triggers a second instruction in the reactive application to continue execution of the reactive application. Responsive to the execution of the reactive application being continued, clocking of the substitute clock is continued.

17 Claims, 5 Drawing Sheets

(56) References Cited

U.S. PATENT DOCUMENTS

| | | | |
|---|---|---|---|
| 9,063,766 B2 | 6/2015 | Chow et al. | |
| 2002/0199173 A1 | 12/2002 | Bowen | |
| 2003/0028858 A1 | 2/2003 | Hines | |
| 2003/0144828 A1 | 7/2003 | Lin | |
| 2004/0040013 A1* | 2/2004 | Kalra | G06F 11/362 717/129 |
| 2004/0153890 A1 | 8/2004 | Davis et al. | |
| 2005/0149693 A1 | 7/2005 | Barry | |
| 2005/0166092 A1* | 7/2005 | Swoboda | G06F 11/3656 714/30 |
| 2006/0117274 A1 | 6/2006 | Tseng et al. | |
| 2006/0161818 A1* | 7/2006 | Tousek | G06F 11/273 714/45 |
| 2007/0198971 A1 | 8/2007 | Dasu et al. | |
| 2008/0058962 A1 | 3/2008 | Ward | |
| 2008/0155299 A1 | 6/2008 | Vertes et al. | |
| 2009/0089761 A1 | 4/2009 | Lazzaro et al. | |
| 2010/0192134 A1* | 7/2010 | Arkhipov | G06F 11/3644 717/129 |
| 2011/0107310 A1 | 5/2011 | Pont et al. | |
| 2011/0234137 A1* | 9/2011 | Imamura | G06F 1/04 318/453 |
| 2013/0007718 A1 | 1/2013 | Bates | |
| 2013/0111189 A1 | 5/2013 | Boehl et al. | |
| 2013/0322461 A1 | 12/2013 | Poulsen | |
| 2014/0146062 A1 | 5/2014 | Kiel et al. | |
| 2014/0245069 A1 | 8/2014 | Hu et al. | |

OTHER PUBLICATIONS

GDB, How to Pause System Clock Also?, retrieved from http://stackoverflow.com/questions/27504953/gdb-how-to-pause-system-clock-also (1 page).

JVM Clock Drift, Date / Time not in Synch Across Multiple JVMs, Feb. 1, 2006, retrieved from http://h30499.www3.hp.com/t5/Languages-and-Scripting/JVM-Clock-Drift-date-time-not-in-synch-across-multiple-JVMs/td-p/3722555#.Ve_WbhGeDGc (3 pages).

Barr et al., JiST: Embedding Simulation Time into a Virtual Machine, 2003, Computer Science and Electrical Engineering Cornell University, Ithaca NY, retrieved from http://jist.ece.cornell.edu/docs/030612-simtime.pdf (16 pages).

* cited by examiner

SYSTEM, METHOD AND APPARATUS FOR DEBUGGING OF REACTIVE APPLICATIONS

PRIORITY CLAIM

The present application is a continuation of and claims priority to and the benefit of U.S. application Ser. No. 14/930,910, filed Nov. 3, 2015, the entire content of which is hereby incorporated by reference herein.

BACKGROUND

Computer systems typically rely on one or more software components or applications to perform a variety of tasks. Multiple components of a computer system may operate in conjunction to complete such tasks, for example executing one or more applications cooperatively and/or in parallel.

The process of debugging applications involves the identification of anomalies or defects in the code of application programs in order to ultimately resolve such issues. As a practical matter, testing an application program may entail executing the program and examining the results it produces, as well as observing the program's execution with a development tool called a debugger. As the number of components in a system operating in conjunction increases, it may become increasingly complex to debug the one or more applications executing on each of the components and/or to debug the one or more applications as a whole. Accordingly, improved methods and systems for debugging applications are desirable.

SUMMARY

The present disclosure provides a new and innovative system, methods and apparatus for debugging of reactive applications.

The system includes a debugger including a client interface, a debugger engine, a memory, and one or more processors. The debugger executes on the one or more processors to receive a first debugging command from a client, where the first debugging command sets a first instruction in the reactive application to suspend execution of the reactive application, and where during execution of the reactive application the first instruction is triggered which suspends execution of the reactive application according to the first instruction. Responsive to the execution of the reactive application being suspended according to the first instruction, a system clock of the reactive application is replaced with a substitute clock and the substitute clock is paused. The debugger then receives a second debugging command, where the second debugging command triggers a second instruction in the reactive application to continue execution of the reactive application. Responsive to the execution of the reactive application being continued according to the second instruction, clocking of the substitute clock is continued.

Additional features and advantages of the disclosed method and apparatus are described in, and will be apparent from, the following Detailed Description and the Figures.

DETAILED DESCRIPTION OF EXAMPLE EMBODIMENTS

Figure 1:
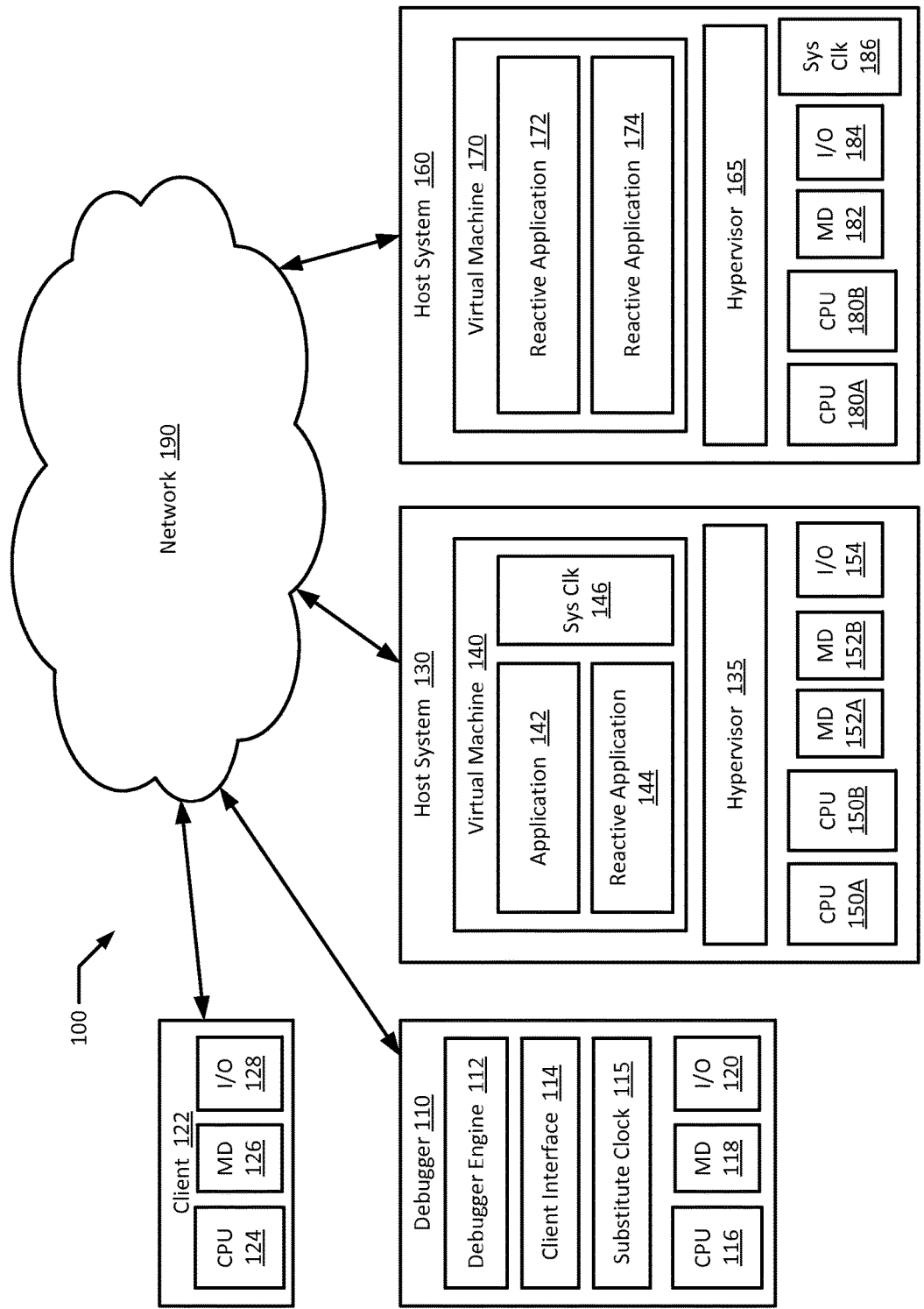
FIG. 1 is a block diagram of an example system for the debugging of reactive applications according to an example embodiment of the present disclosure.

Reactive applications (144, 172, and/or 174) of the present disclosure generally refer to software components which, at one or more times during execution require an input or message from a user, another application or module, and/or an external component (such as another computer system, device, database, etc.). As used herein, an application may be referenced as a software component, program, a function, a procedure, a subroutine, code, or the like. Reactive applications (144, 172, and/or 174) may use timeouts in sending and receiving messages such that if an expected input or message is not received within the timeout period, the reactive application (144, 172, and/or 174) will timeout. For example, a reactive application (144, 172, and/or 174) may be based on asynchronous programming. If a timeout occurs during the debugging of a reactive application (144, 172, and/or 174), the debugger may identify an error in the execution of the reactive application (144, 172, and/or 174) even though the timeout may simply have been a result of the debugger 110 suspending execution of the reactive application (144, 172, and/or 174) to permit a user or developer to debug the reactive application (144, 172, and/or 174). To address this issue, the system, method, and apparatus of the present disclosure may replace a system clock (146 and/or 186) of the reactive application (144, 172, and/or 174) with a substitute clock 115 and pause clocking of the substitute clock 115 responsive the execution of a reactive application (144, 172, and/or 174) being suspended. Responsive to the execution of the reactive application (144, 172, and/or 174) being continued, clocking of the substitute clock 115 may be continued. In an example embodiment, the substitute clock 115 may be controlled to either avoid or intentionally cause timeouts of the reactive application (144, 172, and/or 174). Additional features and advantages of the disclosed method, system, and apparatus are described below.

FIG. 1 depicts a block diagram of an example system for debugging a reactive application according to an example embodiment of the present disclosure. The computer system 100 includes one or more host systems (host system 130 and host system 160), one or more debuggers 110, and one or more clients 122. Each host system (130 and/or 160), debugger 110, and client 122 may in turn include one or more physical processors (e.g., CPU 116, CPU 124, CPU 150A-B, and CPU 180A-B) communicatively coupled to respective memory devices (e.g., MD 118, MD 126, MD 152A-B, and MD 182) and input/output devices (e.g., I/O 120, I/O 128, I/O 154, and I/O 184A-B).

As used herein, physical processor or processor (116, 120, 150A-B, and 180A-B) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device (118, 126, 152A-B, and 182) refers to a volatile or non-volatile memory device, such as RAM, ROM, EEPROM, or any other device capable of storing data. As discussed herein, I/O device (120, 128, 154, and 184A-B) refers to a device capable of providing an interface between one or more processor pins and an external device capable of inputting and/or outputting binary data.

Processors (116, 124, 150A-B, and 180A-B) may be interconnected using a variety of techniques, ranging from a point-to-point processor interconnect, to a system area network, such as an Ethernet-based network. Local connections within each host (130 and 160), debugger 110, or client 122, including, for example, the connections between processors 150A-B and memory 152A-B and between processors 150A-B and I/O device 154 may be provided by one or more local buses of suitable architecture, for example, peripheral component interconnect (PCI).

Each host (130 and/or 160) may run one or more virtual machines (VM 140 and/or 170), by executing a software layer (hypervisor 135 and/or 165) above the hardware and below the virtual machines (140 and/or 170), as schematically shown in FIG. 1. In an example embodiment, the hypervisor (135 and/or 165) may be a component of a host operating system executed by the host (130 and/or 160). In another example embodiment, the hypervisor (135 and/or 165) may be provided by a program running on an operating system, or may run directly on the computer system 100 without an operating system beneath it. The hypervisor (135 and/or 165) may virtualize the physical layer, including processors, memory, and I/O devices, and present this virtualization to virtual machines (140 and/or 170) as devices. One or more applications (including reactive applications) (142, 144, 172, and/or 174), may be executed by a virtual machine 170A-B. In an example embodiment, reactive applications may be executed by non-virtualized computer systems.

A host system (130 and/or 160) and/or virtual machine (140 and/or 170) may include a system clock (146 and/or 186). As used herein, a system clock (146 and/or 186) generally refers to a clock of a host system or virtual machine that the reactive application uses to keep time.

In an example embodiment, the host system (130 and/or 160), debugger 110, and/or client 122 may communicate via a network 190. For example, the network 190 may be a public network (e.g., the Internet), a private network (e.g., a local area network (LAN) or wide area network (WAN)), or a combination thereof. In an example embodiment, the host system (130 and/or 160), debugger 110, and client 122 may reside on a single device and may not be required to communicate over a network 190. In an example embodiment, a debugger 110 and a client 122 may reside on a single device and may communicate with a host system (130 and/or 160) over a network 190.

In an example embodiment, the computer system 100 includes a debugger 110 and a client 122 to debug applications (including reactive applications) (142, 144, 172, and/or 174). In an example embodiment, communications among host system 130, host system 160, and other network nodes, devices, and programs may be routed through the debugger 110. In an example embodiment, communications among reactive applications (144, 172, and/or 174) as well as execution data and states of the reactive applications (144, 172, and/or 174) may be routed through the debugger 110.

In an example embodiment, a client 122 may be a personal computing device, server, etc. In another example embodiment, a client 122 may be a virtual machine or program executing on a personal computing device, server, one or more physical processors, etc. In an example embodiment, a user or application developer communicates with the debugger 110 via the client 122.

In an example embodiment, the debugger 110 is provided for debugging one or more applications (including reactive applications) (142, 144, 172, and/or 174). In the illustrated example embodiment, a debugger 110 includes a debugger engine 112 and a client interface 114 for interfacing with a client 122. In an example embodiment, the debugger engine 112 may be able to debug one or more programming languages including C, C-sharp, jBPM, Visual Basic, SQL, Pascal, COBOL, etc. A debugger 110 generally refers to a debugging tool that supports the debugging of a particular set of programming languages. In an example embodiment, the debugger 110 may include a substitute clock 115. In another example embodiment, a substitute clock 115 may reside on a host system (130 and/or 160). In yet another example embodiment, the substitute clock 115 may be located outside both a debugger 110 and a host system (130 and/or 160). The substitute clock 115 is described in greater detail below and with respect to FIG. 2.

In an example embodiment, a user can use the client 122 to issue debugging commands to the debugger 110 and receive debugging information via an interface on the client 122 that is provided by the client interface 114 on the debugger 110. For example, the client interface 114 of the debugger 110 may be configured to provide a set of debugging commands to a user via the client 122. For example, a debugger 110 debugging command may include setting a breakpoint, clearing a breakpoint, setting a watchpoint, clearing a watchpoint, setting a catchpoint, clearing a catchpoint, stepping over, stepping into, stepping out, jumping, resuming, running, stopping, getting a variable, getting a source, evaluating an expression, showing stack frame information, etc.

In an example embodiment, debugging information received may include contents of memory locations at a particular stage of execution, a call stack of routines that have been invoked but not yet ended at the particular stage of execution, lists of objects associated with the routines, tracing information describing which instructions are being executed, time profile information describing the execution time of one or more instructions, and any other information that a user may utilize to troubleshoot the performance of one or more applications (including reactive applications) (142, 144, 172, and/or 174). For example, the client 122 may present a graphical user interface (GUI) received from the client interface 114 including information about high-level language statements, contents of memory when the high-level language statements are executed, available meta-debugger debugging commands, etc.

In an example embodiment, the debugger 110 holds the state of running services of the reactive applications (144, 172, and/or 174) including the running threads, the stack frame information, and breakpoints set in the services routines. Accordingly, in an example embodiment, the debugger 110 may determine the location of a breakpoint in the code of a reactive application (144, 172, and/or 174) and trigger the breakpoint when the location of the breakpoint is hit.

In an example embodiment, the debugger engine 112 and the client interface 114 may be combined into one module. In an example embodiment, the debugger engine 112 and the client interface 114 may each be divided into additional separate modules. In an example embodiment, above described aspects of each of the debugger engine 112 and the client interface 114 may be performed by a different module.

Figure 2:
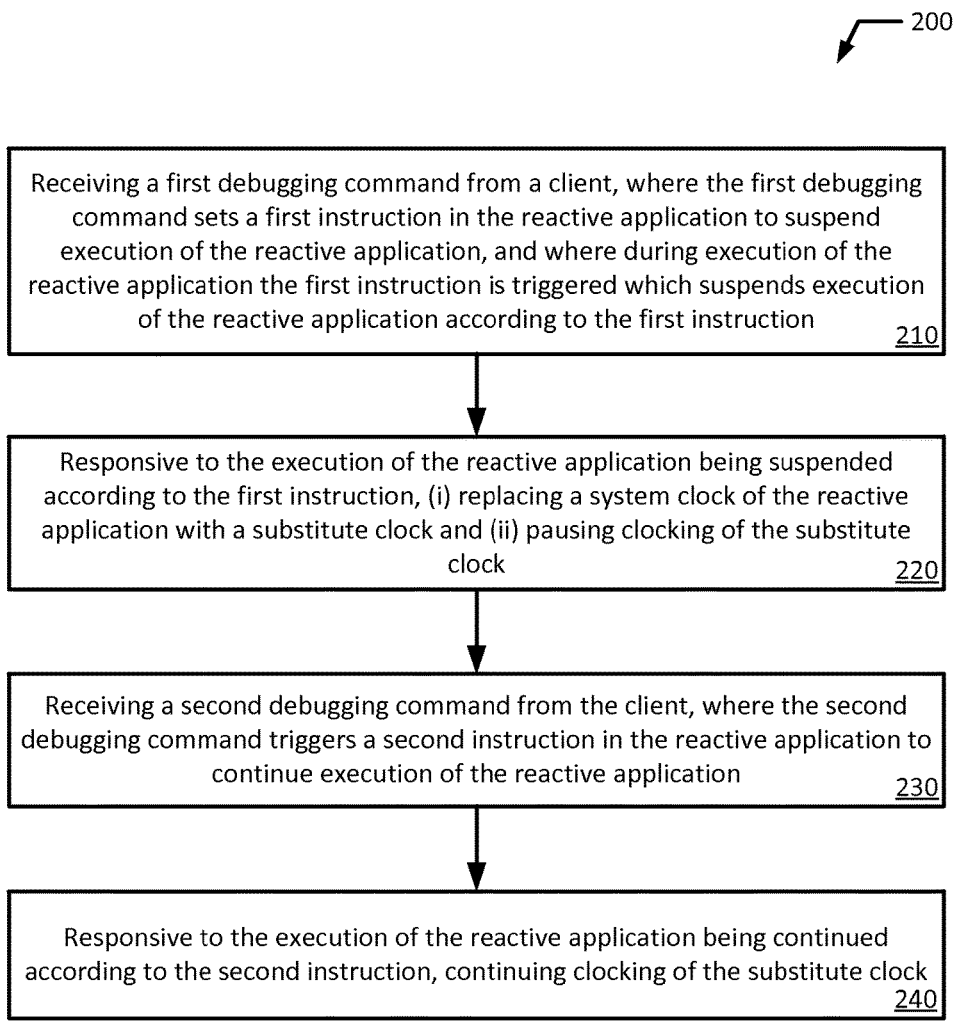
FIG. 2 is a flowchart illustrating an example process for the debugging of reactive applications according to an example embodiment of the present disclosure.

FIG. 2 illustrates a flowchart of an example method 200 for a debugging a reactive application in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example embodiment, the method is performed by a debugger 110.

The example method 200 starts and a debugger 110 receives a first debugging command from a client 122, where the first debugging command sets a first instruction in the reactive application to suspend execution of the reactive application, and where during execution of the reactive application the first instruction is triggered which suspends execution of the reactive application according to the first instruction (block 210).

In an example embodiment, the first instruction is set in substantially close proximity to a timeout call. In an example embodiment, a timeout call refers to a function call or one or more instructions that will trigger a timeout of the reactive application (144, 172, and/or 174) if certain conditions occur. For example, a timeout call may cause a timeout of the reactive application (144, 172, and/or 174) if an expected input or message is not received before a time period greater than or equal to the timeout period has elapsed. In an example embodiment, substantially close proximity means that the first instruction may be set one or more lines before, at, or one or more lines after a timeout call. In an example embodiment, substantially close proximity means that the first instruction may be set within a few lines of a timeout call.

In an example embodiment, the first instruction is a breakpoint and responsive to the triggering of the breakpoint, the execution of the reactive application (144, 172, and/or 174) is suspended. In an example embodiment, the breakpoint is set in substantially close proximity to a timeout call. In an example embodiment, the first instruction may be a watchpoint, catchpoint, break condition, an instruction to stop execution, or other instruction to suspend the execution of a program, and which responsive to the triggering of the watchpoint, catchpoint, break condition, instruction to stop execution, or other instruction that suspends the execution of a program, the execution of the reactive application (144, 172, and/or 174) is suspended. As used herein, a breakpoint identifies a location within a reactive application (144, 172, and/or 174) at which execution should be suspended. Suspending a reactive application (144, 172, and/or 174) at a breakpoint in this manner may give a user or developer the opportunity to inspect debugging information and the reactive application (144, 172, and/or 174) at that particular point of execution.

Then, responsive to the execution of the reactive application being suspended according to the first instruction, the debugger 110 (i) replaces a system clock (146 and/or 186) of the reactive application with a substitute clock 115 and (ii) pauses clocking of the substitute clock 115 (block 220).

In an example embodiment, a substitute clock 115 operates independently of the system clock (146 and/or 186). For example, the substitute clock 115 may have its own timer. In an example embodiment, a substitute clock 115 is dependent on a system clock (146 and/or 186). For example, the time of the substitute clock 115 may be dependent on or calculated using the system clock (146 and/or 186). For example, the time of the substitute clock 115 may be equal to the time of the system clock (146 and/or 186) subtracted by a cumulative time delay quantity. In an example embodiment, the substitute clock 115 may remain behind the system clock (146 and/or 186) for the entirety of the debugging session.

In an example embodiment, replacing the system clock (146 and/or 186) of the reactive application (144, 172, and/or 174) with the substitute clock 115 includes intercepting a function call of the reactive application (144, 172, and/or 174) requesting the time of the system clock (146 and/or 186) and responsive to intercepting the function call, providing to the reactive application (144, 172, and/or 174) the time of the substitute clock 115. In an example embodiment, each time a function call is made requesting the time of the system clock (146 and/or 186), the time of the substitute clock 115 is provided to the reactive application (144, 172, and/or 174). In an example embodiment, the debugger 110 intercepts the function call of the reactive application (144, 172, and/or 174) requesting the time of the system clock (146 and/or 186) and responsive to intercepting the function call, provides to the reactive application (144, 172, and/or 174) the time of the substitute clock 115. In an example embodiment, the substitute clock 115 intercepts the function call of the reactive application (144, 172, and/or 174) requesting the time of the system clock (146 and/or 186) and responsive to intercepting the function call, provides to the reactive application (144, 172, and/or 174) the time of the substitute clock 115.

In an example embodiment, replacing the system clock (146 and/or 186) of the reactive application (144, 172, and/or 174) with the substitute clock 115 includes adding a substitute clock 115 function to a host system (130 and/or 160) or to a virtual machine (140 and/or 170). In an example embodiment, the virtual machine (140 and/or 170) is a JAVA Virtual Machine (JVM). For example, adding a substitute clock 115 function may include modifying the code of the JVM to include an additional function for the substitute clock 115.

In an example embodiment, the user or developer causes the system clock (146 and/or 186) to be replaced with the substitute clock 115 via the client 122. In an example embodiment, the debugger 110 replaces the system clock (146 and/or 186) of the reactive application (144, 172, and/or 174) with the substitute clock 115.

In an example embodiment, the steps of (i) replacing the system clock (146 and/or 186) of the reactive application with the substitute clock and (ii) pausing clocking of the substitute clock are performed substantially simultaneously. In an example embodiment, the steps of (i) replacing the system clock (146 and/or 186) of the reactive application with the substitute clock and (ii) pausing clocking of the substitute clock are performed substantially simultaneously such that a first time of the substitute clock when the substitute clock is paused is substantially equal to a first time of the system clock (146 and/or 186) when the reactive application is suspended. In an example embodiment, the debugger 110 pauses clocking of the substitute clock 115. In an example embodiment, the substitute clock 115 is responsible for pausing clocking of the substitute clock 115.

The debugger 110 then receives a second debugging command from the client 122, where the second debugging command triggers a second instruction in the reactive application (144, 172, and/or 174) to continue execution of the reactive application (144, 172, and/or 174) (block 230). Then, responsive to the execution of the reactive application being continued according to the second instruction, the clocking of the substitute clock is continued (block 240).

In an example embodiment, the second instruction may be an instruction to resume, step through, jump, or otherwise continue the execution of a program. In an example embodiment, the second instruction may be triggered by a command to resume execution of the reactive application (144, 172, and/or 174). Accordingly, in this example embodiment, continuing execution of the reactive application (144, 172, and/or 174) would include resuming execution of the reactive application (144, 172, and/or 174). Similarly, in this example embodiment, continuing clocking of the substitute clock 115 would include resuming clocking of the substitute clock 115.

In an example embodiment, the second instruction may be triggered by a command to step through the reactive application (144, 172, and/or 174) by one or more instructions or lines of code. Accordingly, in this example embodiment, continuing execution of the reactive application (144, 172, and/or 174) would include stepping through the reactive application (144, 172, and/or 174). Similarly, in this example embodiment, continuing clocking of the substitute clock 115 would include stepping the time of the substitute clock 115 forward by a predefined interval of time. For example, the user or developer may define this predefined interval of time. The debugger 110 may also set this predefined interval of time based on a measured (or estimated) length of time that the reactive application (144, 172, and/or 174) takes to execute the instructions that have been stepped through.

In an example embodiment, the second instruction may be triggered by a command to step through the reactive application (144, 172, and/or 174) by one or more instructions or lines of code. Accordingly, in this example embodiment, continuing execution of the reactive application (144, 172, and/or 174) would include jumping to a different instruction or call of the reactive application (144, 172, and/or 174). Similarly, in this example embodiment, continuing clocking of the substitute clock would include jumping the time of the substitute clock 115 forward by a predefined interval of time. For example, the user or developer may define this predefined interval of time. The debugger 110 may also set this predefined interval of time based on a measured (or estimated) length of time that the reactive application (144, 172, and/or 174) takes to execute the instructions that have been jumped through.

In an example embodiment, example method 200 may further include intercepting a function call of the reactive application (144, 172, and/or 174) requesting the time of the system clock (146 and/or 186). Then, responsive to intercepting the function call, providing to the reactive application (144, 172, and/or 174) the time of the substitute clock 115.

In an example embodiment, example method 200 may further include measuring a first time delay between the execution of the reactive application (144, 172, and/or 174) being suspended according to the first instruction and the execution of the reactive application (144, 172, and/or 174) being continued according to the second instruction and adding the first time delay to a cumulative time delay quantity. In an example embodiment, an initial value of the cumulative time delay quantity is set to 0.

For example, each time the reactive application (144, 172, and/or 174) is suspended and then subsequently continued, the substitute clock 115 is respectively paused and continued. In addition, a time delay between pausing and resuming of the reactive application (144, 172, and/or 174) may be measured. The cumulative time delay quantity may then be increased by this measured time delay.

In an example embodiment, the example method 200 may further include receiving by the debugger 110 a third debugging command from the client 122, where the third debugging command sets a third instruction in the reactive application to suspend the execution of the reactive application, and where during execution of the reactive application the third instruction is triggered which suspends execution of the reactive application according to the third instruction. Then, responsive to the execution of the reactive application being suspended according to the third instruction, pausing the clocking of the substitute clock. Then, receiving by the debugger 110 a fourth debugging command from the client 122, where the fourth debugging command triggers a fourth instruction in the reactive application continue execution of the reactive application. Then, responsive to the execution of the reactive application being continued according to the fourth instruction, continuing clocking of the substitute clock. According to this example embodiment, the example method 200 may further include measuring a second time delay between the execution of the reactive application (144, 172, and/or 174) being suspended according to the third instruction and the execution of the reactive application (144, 172, and/or 174) being continued according to the fourth instruction and adding the second time delay to a cumulative time delay quantity. Then, responsive to a function call of the reactive application (144, 172, and/or 174) requesting the time of the system clock (146 and/or 186) being intercepted, providing to the reactive application (144, 172, and/or 174) the time of the substitute clock 115.

As described above, the time of the substitute clock 115 may be equal to the time of the system clock (146 and/or 186) subtracted by a cumulative time delay quantity. In an example embodiment, the substitute clock 115 may remain behind the system clock (146 and/or 186) for the entirety of the debugging session. In an example embodiment, the clocking rate of the substitute clock 115 may be the same as the system clock (146 and/or 186). In another example embodiment, the clocking rate of the substitute clock 115 may be higher or lower than the system clock (146 and/or 186). In an example embodiment, the clocking rate of the substitute clock 115 may be defined by the debugger 110 or a user. For example, the clocking rate of the substitute clock 115 may be increased until the time of the substitute clock 115 catches up to the time of the system clock (146 and/or 186).

In an example embodiment, the time of the substitute clock 115 may be set by a user or developer. For example, a user may want to cause the time of the substitute clock 115 to jump forward and intentionally cause an error, such as a timeout error, to be triggered. This would allow the user to identify and debug any problems that arise as a result. In an example embodiment, the substitute clock 115 is removed and replaced with the system clock (146 and/or 186) once the debugging session is complete.

Figure 3A:
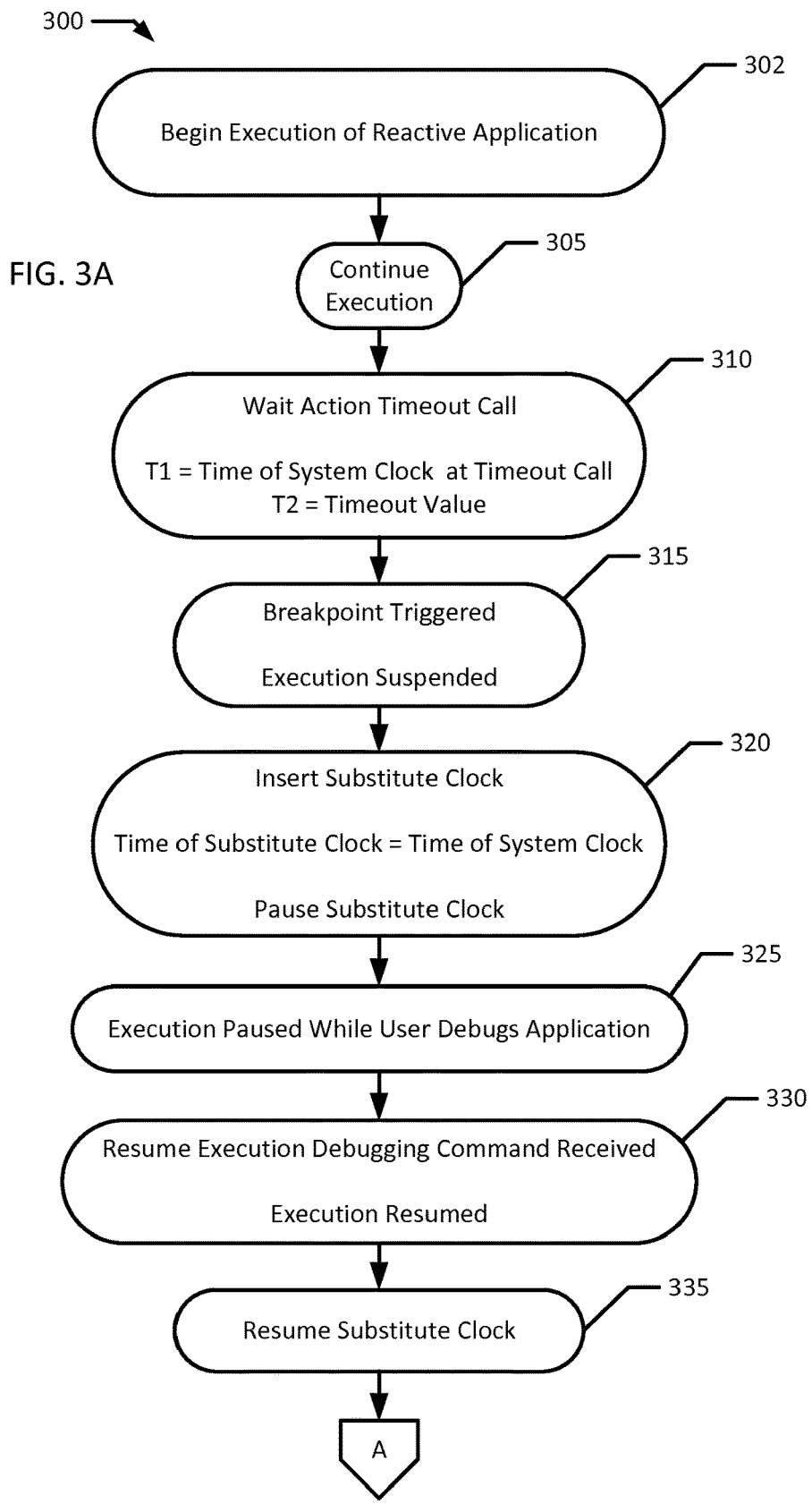
FIG. 3A is a flowchart illustrating an example process for debugging a reactive application according to an example embodiment of the present disclosure.
Figure 3B:
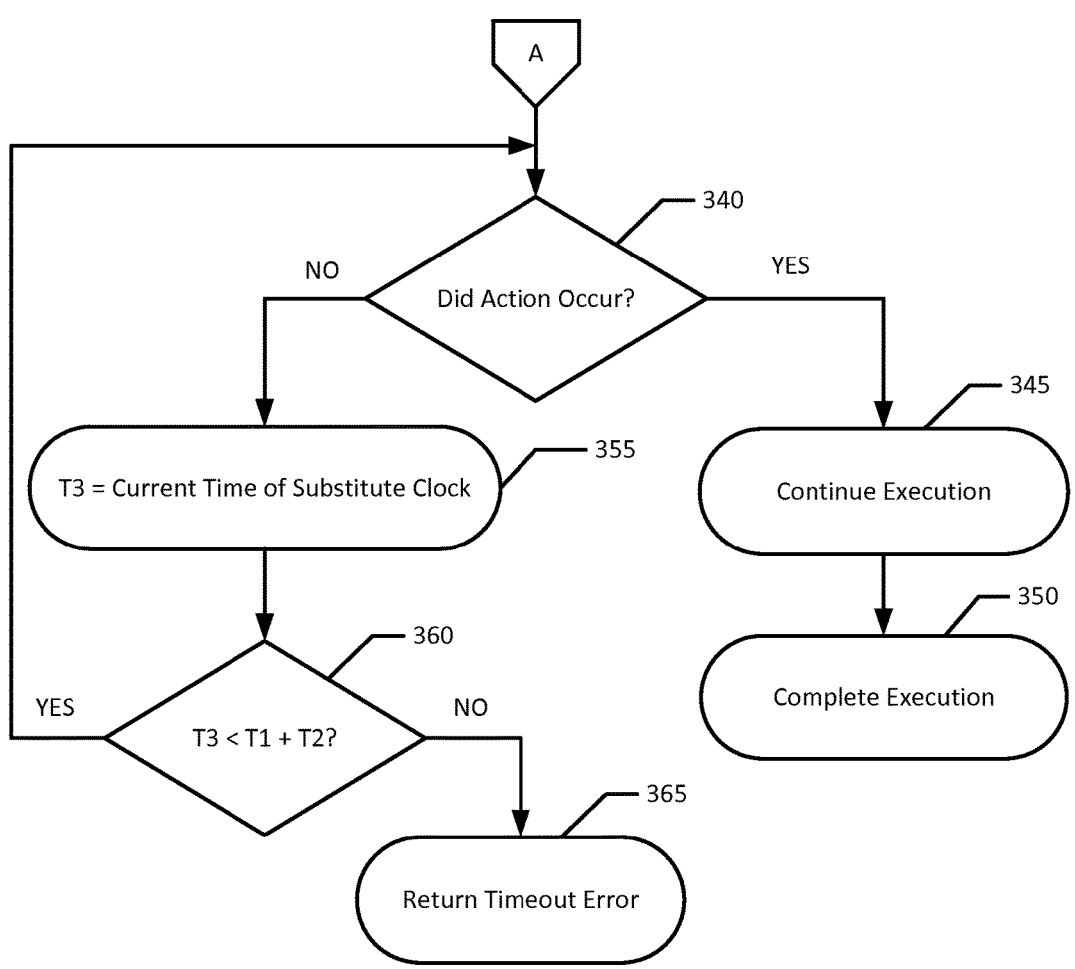
FIG. 3B is a flowchart continuing the example process illustrated in FIG. 3A.

FIGS. 3A and 3B illustrates a flowchart of an example method 300 for a debugging a reactive application in accordance with an example embodiment of the present disclosure. Although the example method 300 is described with reference to the flowchart illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

As illustrated in FIG. 3A, the example method 300 starts and the execution of the reactive application (144, 172, and/or 174) begins as the reactive application (144, 172, and/or 174) is being debugged (block 302). The execution of the reactive application (144, 172, and/or 174) may continue as it performs one or more tasks (block 305). Then at a time of T1, where T1 is the time of the system clock (146 and/or 186) at a wait action timeout call, the reactive application (144, 172, and/or 174) executes a wait action timeout call (block 310). Here, T2 refers to the timeout value of the wait action timeout call. For example, if a time greater than or equal to a T2 quantity of time elapses before a certain action defined by the call occurs, the wait action timeout call will cause the reactive application (144, 172, and/or 174) to timeout. For example, the wait action timeout call may wait for an action, message, and/or input from a user, a device, a program, a database, or another external module or system. As an example for the purposes of explanation, T1 equals 2000 milliseconds (ms) and T2 equals 100 ms. In an example embodiment, the debugger 110 has placed a breakpoint at the wait action timeout call. Accordingly, when the wait action timeout call is executed, the breakpoint is triggered and execution of the reactive application (144, 172, and/or 174) is suspended (block 315). Then a substitute clock 115 is inserted that replaces the system clock (146 and/or 186) (block 320). The time of the substitute clock 115 is set to the time of the system clock (146 and/or 186) and the clocking of the substitute clock 115 is paused (block 320). In the example described above, the time of the substitute clock 115 would be substantially equal to 2000 ms. In the meanwhile, the system clock (144, 172, and/or 174) continues to be clocked and the time of the system clock (144, 172, and/or 174) increases. Then the execution of the reactive application (144, 172, and/or 174) is paused while the user is given an opportunity to debug the reactive application (144, 172, and/or 174) (block 325). The user may then issue a debugging command via the debugger 110 to resume execution of the reactive application (144, 172, and/or 174). When this command is received, the execution of the reactive application (144, 172, and/or 174) is resumed (block 330). At substantially the same time, the clocking of the substitute clock 115 is resumed (block 335).

Method 300 is continued in FIG. 3B. The wait action timeout call then determines whether the action defined by the call has occurred yet (block 340). If the action has occurred, no timeout occurs and the reactive application (144, 172, and/or 174) continues execution (block 345). The reactive application (144, 172, and/or 174) may then complete execution (block 350). In an example embodiment, additional timeout calls may occur before the reactive application (144, 172, and/or 174) completes execution.

If no action has occurred, a variable T3 is set to the current time of the substitute clock 115 (block 355). In the example provided above, a certain amount of time (e.g., 50 ms) may have elapsed and so T3 may equal 2050 ms. Then the reactive application (144, 172, and/or 174) determines whether T3 is less than the sum of T1 plus T2. If T3 is not less than this quantity, the reactive application (144, 172, and/or 174) times out and a timeout error is returned (block 365). If T3 is less than this quantity, the reactive application (144, 172, and/or 174) once again checks whether an action defined by the wait action timeout call has occurred (340). In the example provided above, T1 plus T2 equals 2100 ms and T3 (2050 ms) is less than this quantity. As such, a timeout does not occur. However, if T3 subsequently becomes greater than or equal to T1 plus T2 (2100 ms), the reactive application (144, 172, and/or 174) would return a timeout error.

If, for example, T3 was set to current time of the system clock (146 and/or 186), the reactive application (144, 172, and/or 174) may typically timeout because the system clock (146 and/or 186) was not paused while the reactive application (144, 172, and/or 174) was paused for debugging, and the user or developer may typically take more than a timeout (T2) quantity of time to debug the reactive application (144, 172, and/or 174) while it is paused. Accordingly, in the above example, if the reactive application (144, 172, and/or 174) was suspended for 10 seconds (10,000 ms) while the user debugged the application, and T3 was set to the time of the system clock (146 and/or 186) rather than the time of the substitute clock 115, then T3 (2000+10,000=12,000 ms) would be greater than T1 plus T2 (2100 ms) and the reactive application (144, 172, and/or 174) would timeout. This might make it difficult for a user to debug a reactive application (144, 172, and/or 174) due to the regular occurrence of timeout errors. By setting T3 to the current time of the substitute clock 115, the presently disclosed system advantageously addresses this potential issue.

Figure 4:
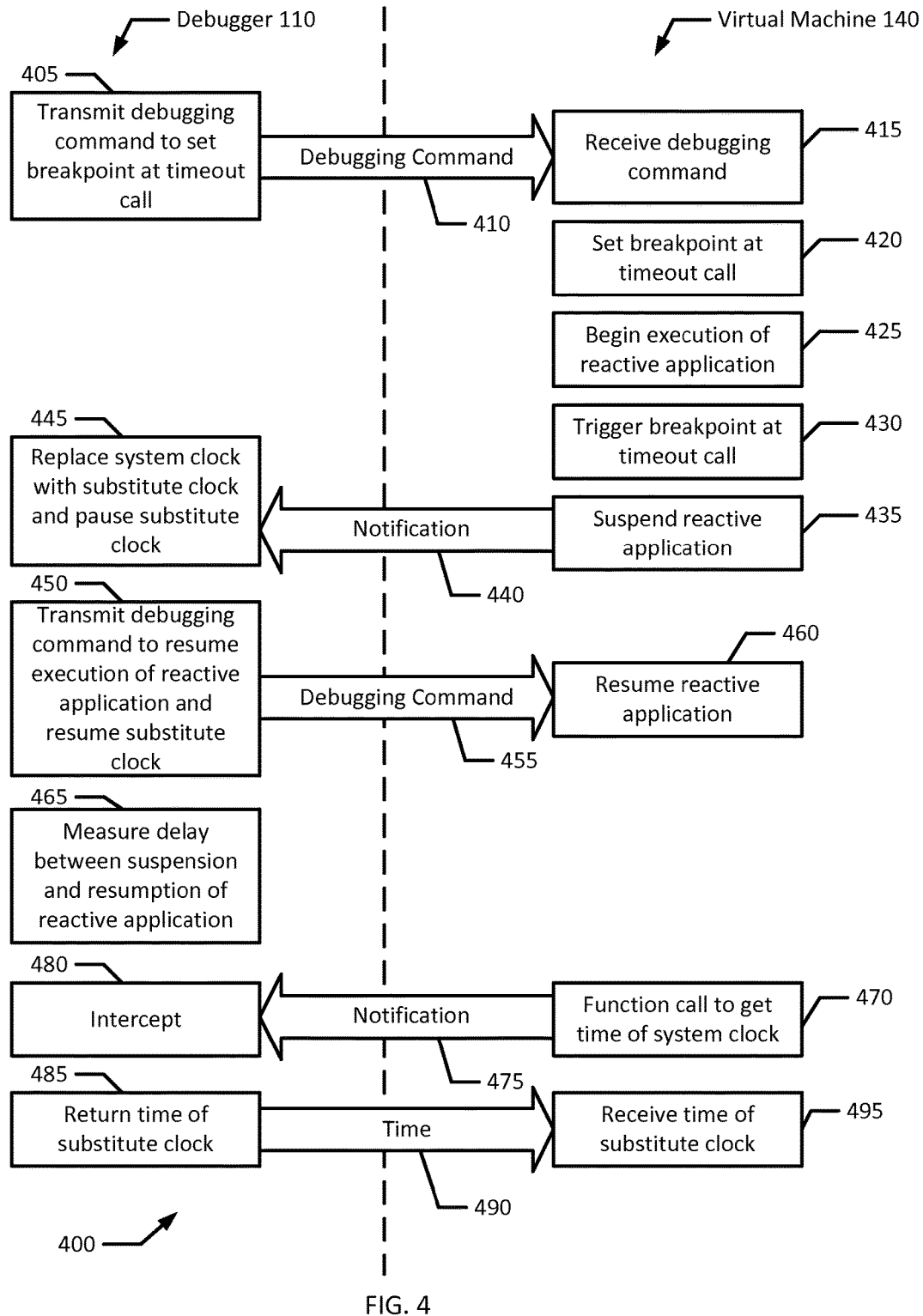
FIG. 4 is a flow diagram illustrating an example process for the debugging of reactive applications according to an example embodiment of the present disclosure.

FIG. 4 illustrates a flow diagram of an example method 400 for debugging of reactive applications in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

In the illustrated example embodiment, a debugger 110 transmits a debugging command to set a breakpoint at a timeout call of a reactive application (144, 172, and/or 174) (blocks 405 and 410). A virtual machine 140 receives the debugging command (block 415). A breakpoint is then set at the timeout call of the reactive application (144, 172, and/or 174) (block 420). The reactive application (144, 172, and/or 174) on the virtual machine 140 begins executing (block 425). The breakpoint is triggered at the timeout call (block 430). This causes the reactive application (144, 172, and/or 174) to be suspended (block 435). A notification is provided to the debugger 110 that the reactive application (144, 172, and/or 174) has been suspended (block 440). The debugger 110 then replaces a system clock (146 and/or 186) of the reactive application with a substitute clock 115 and pauses the substitute clock 115 (block 445). In an example embodiment the debugger 110 may replace a system clock (146 and/or 186) of the reactive application with a substitute clock 115 and pauses the substitute clock 115 before a breakpoint is triggered.

The debugger 110 may then transmit a debugging command to resume execution of the reactive application (144, 172, and/or 174) and additionally resume clocking of the substitute clock 115 (blocks 450 and 455). Once received, execution of the reactive application (144, 172, and/or 174) may be resumed (block 460). The debugger 110 measures the delay between the execution of the reactive application (144, 172, and/or 174) being suspended and the execution of the reactive application being resumed (144, 172, and/or 174) (block 465). The reactive application (144, 172, and/or 174) then executes a function call to get the time of the system clock (146 and/or 186). A notification is provided to the debugger 110 (block 475). The debugger 110 then intercepts the function call (or the response to the function call) (block 480). The debugger 110 then returns the time of the substitute clock (block 485 and 490). The reactive application (144, 172, and/or 174) executing on the virtual machine 140 receives the time of the substitute clock 115 (block 495). If, for example, the function call to retrieve the time of the system clock (146 and/or 186) was part of a timeout call, then returning the time of the substitute clock 115 would minimize the risk that a timeout would occur due to the user debugging the reactive application (144, 172, and/or 174).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A computer system for debugging a reactive application comprising:
   a debugger including:
      a debugger engine;
      a memory; and
      one or more processors in communication with the memory, wherein the debugger executes on the one or more processors to:
         receive, by the debugger, a first debugging command, wherein the first debugging command sets a first instruction in the reactive application to suspend execution of the reactive application, and wherein during execution of the reactive application the first instruction is triggered which suspends execution of the reactive application according to the first instruction;
         responsive to the execution of the reactive application being suspended according to the first instruction, replace a system clock of the reactive application with a substitute clock, wherein replacing the system clock of the reactive application with the substitute clock includes adding a substitute clock function to a second computer system of the reactive application;
         receive, by the debugger, a second debugging command, wherein the second debugging command triggers a second instruction in the reactive application to continue execution of the reactive application; and
         after the continued execution of the reactive application begins, return, by the debugger, a time of the substitute clock instead of a time of the system clock when the reactive application sends a query for time to the system clock,
         wherein the time of the substitute clock has been modified prior to the continued execution of the reactive application by jumping the time of the substitute clock at least one of forwards and backwards as compared to the time of the system clock.

2. The system of claim 1, wherein the second computer system includes a virtual machine that executes the reactive application.

3. The system of claim 1, wherein the system includes a client which communicates with the debugger.

4. The system of claim 1, wherein the first instruction is set in substantially close proximity to a timeout call.

5. The system of claim 1, wherein the first instruction is a breakpoint, wherein responsive to the triggering of the breakpoint, execution of the reactive application is suspended.

6. The system of claim 1, wherein the second computer system is a JAVA Virtual Machine (JVM) system.

7. A method for debugging a reactive application, comprising:
   receiving, by a debugger executing on a first computer system, a first debugging command, wherein the first debugging command sets a first instruction in the reactive application to suspend execution of the reactive application, and wherein during execution of the reactive application the first instruction is triggered which suspends execution of the reactive application according to the first instruction;
   responsive to the execution of the reactive application being suspended according to the first instruction, replacing a system clock of the reactive application with a substitute clock wherein replacing the system clock of the reactive application with the substitute clock includes adding a substitute clock function to a second computer system of the reactive application;
   receiving, by the debugger, a second debugging command, wherein the second debugging command triggers a second instruction in the reactive application to continue execution of the reactive application; and
   after the continued execution of the reactive application begins, returning, a time of the substitute clock instead of a time of the system clock when the reactive application sends a query for time to the system clock,
   wherein the time of the substitute clock has been modified prior to the continued execution of the reactive application by jumping the time of the substitute clock at least one of forwards and backwards as compared to the time of the system clock.

8. The method of claim 7, wherein the first instruction is set in substantially close proximity to a timeout call.

9. The method of claim 7, wherein the first instruction is a breakpoint, and wherein responsive to the triggering of the breakpoint execution of the reactive application is suspended.

10. The method of claim 7, wherein the second computer system is a JAVA Virtual Machine (JVM) system.

11. The method of claim 7, further comprising:
measuring a first time delay between the execution of the reactive application being suspended according to the first instruction and the execution of the reactive application being continued according to the second instruction; and
adding the first time delay to a cumulative time delay quantity.

12. The method of claim 11, wherein the time of the substitute clock is equal to the time of the system clock subtracted by the cumulative time delay quantity.

13. The method of claim 7, wherein the substitute clock is independent of the system clock.

14. A computer-readable non-transitory storage medium storing executable instructions for debugging a reactive application, which when executed by a computer system, cause the computer system to:
receive, by a debugger executing on the computer system, a first debugging command, wherein the first debugging command sets a first instruction in the reactive application to suspend execution of the reactive application, and wherein during execution of the reactive application the first instruction is triggered which suspends execution of the reactive application according to the first instruction;
responsive to the execution of the reactive application being suspended according to the first instruction, replace a system clock of the reactive application with a substitute clock wherein replacing the system clock of the reactive application with the substitute clock includes adding a substitute clock function to a second computer system of the reactive application;
receive, by the debugger, a second debugging command, wherein the second debugging command triggers a second instruction in the reactive application to continue execution of the reactive application; and
after the continued execution of the reactive application begins, return, by the debugger, a time of the substitute clock instead of a time of the system clock when the reactive application sends a query for time to the system clock,
wherein the time of the substitute clock has been modified prior to the continued execution of the reactive application by jumping the time of the substitute clock at least one of forwards and backwards as compared to the time of the system clock.

15. The computer-readable non-transitory storage medium of claim 14, wherein the first instruction is set in substantially close proximity to a timeout call.

16. The computer-readable non-transitory storage medium of claim 14, wherein the first instruction is a breakpoint, and wherein responsive to the triggering of the breakpoint, execution of the reactive application is suspended.

17. The computer-readable non-transitory storage medium of claim 14, wherein the second computer system is a JAVA Virtual Machine (JVM) system.

* * * * *